United States Patent
Chen et al.

(10) Patent No.: US 11,466,726 B2
(45) Date of Patent: Oct. 11, 2022

(54) HINGE AND HEAD-MOUNTED DISPLAY INCLUDING THE SAME

(71) Applicant: Quanta Computer Inc., Taoyuan (TW)

(72) Inventors: Chun-Lung Chen, Taoyuan (TW);
Yuan-Peng Yu, Taoyuan (TW);
Ming-Hsueh Tsai, Taoyuan (TW);
Lieh-Hung Liao, Taoyuan (TW);
Kun-Hui Chung, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 70 days.

(21) Appl. No.: 16/995,992

(22) Filed: Aug. 18, 2020

(65) Prior Publication Data
US 2022/0056946 A1 Feb. 24, 2022

(51) Int. Cl.
*F16C 11/04* (2006.01)
*E05D 3/02* (2006.01)
*E05D 5/04* (2006.01)
*G06F 1/16* (2006.01)

(52) U.S. Cl.
CPC .............. *F16C 11/04* (2013.01); *E05D 3/022* (2013.01); *E05D 5/04* (2013.01); *G06F 1/163* (2013.01); *G06F 1/1681* (2013.01); *E05Y 2900/606* (2013.01); *F16C 2380/00* (2013.01)

(58) Field of Classification Search
CPC ...... F16C 11/04; F16C 2380/00; E05D 3/022; E05D 5/04; G06F 1/163; G06F 1/1681; E05Y 2900/606
See application file for complete search history.

(56) References Cited

U.S. PATENT DOCUMENTS

| | | | |
|---|---|---|---|
| 7,650,671 B2 * | 1/2010 | Lee | H04M 1/0237 16/362 |
| 10,028,398 B1 * | 7/2018 | Lin | E05D 11/06 |
| 10,100,970 B1 * | 10/2018 | Wu | E05D 11/00 |
| 10,435,933 B2 * | 10/2019 | Lin | H05K 5/0226 |
| 2012/0180260 A1 * | 7/2012 | Kim | F16C 11/04 16/297 |
| 2012/0318083 A1 * | 12/2012 | Hsu | H04M 1/0247 74/101 |
| 2013/0162128 A1 * | 6/2013 | Yu | H05K 5/0226 312/223.6 |
| 2016/0048175 A1 * | 2/2016 | Hsu | G06F 1/1681 16/244 |

(Continued)

FOREIGN PATENT DOCUMENTS

| | | | |
|---|---|---|---|
| CA | 2179707 A1 * | 12/1996 | E05B 75/00 |
| WO | WO-2018203588 A1 * | 11/2018 | A61B 5/02 |

*Primary Examiner* — Victor D Batson
*Assistant Examiner* — Matthew J Sullivan
(74) *Attorney, Agent, or Firm* — McClure, Qualey & Rodack, LLP

(57) ABSTRACT

A hinge is provided. The hinge includes a first plate, a second plate, a third plate, a shaft, a first elastic element, and a second elastic element. The second plate is connected to the first plate. The third plate is disposed on the second plate. The shaft is connected to the first plate and the second plate. The first elastic element surrounds the shaft. The second elastic element is connected to the second plate and the third plate. The second plate is rotatable around the shaft via the first elastic element. The second plate is movable relative to the third plate via the second elastic element.

20 Claims, 12 Drawing Sheets

(56) References Cited

U.S. PATENT DOCUMENTS

| | | | |
|---|---|---|---|
| 2017/0139446 A1* | 5/2017 | Lan | F16M 13/005 |
| 2017/0146181 A1* | 5/2017 | Chen | F16C 11/04 |
| 2019/0023041 A1* | 1/2019 | Brown | E05D 11/00 |
| 2020/0183463 A1* | 6/2020 | Chen | F16C 11/04 |
| 2021/0293269 A1* | 9/2021 | Yaginuma | A45C 13/005 |

* cited by examiner

HINGE AND HEAD-MOUNTED DISPLAY INCLUDING THE SAME

BACKGROUND OF THE INVENTION

Field of the Invention

The present invention relates to a hinge and a head-mounted display including the hinge.

Description of the Related Art

When a user wears a head-mounted display, the user usually has to adjust the head-mounted display to match his or her own head width (head breadth). However, user experience has to be improved because current head-mounted displays may be too loose or too tight. Therefore, a hinge that may be mounted on a head-mounted display is provided, which is applicable for a greater variety of head widths.

BRIEF SUMMARY OF THE INVENTION

According to some embodiments, a hinge is provided. The hinge includes a first plate, a second plate, a third plate, a shaft, a first elastic element, and a second elastic element. The second plate is connected to the first plate. The third plate is disposed on the second plate. The shaft is connected to the first plate and the second plate. The first elastic element surrounds the shaft. The second elastic element is connected to the second plate and the third plate. The second plate is rotatable around the shaft via the first elastic element. The second plate is movable relative to the third plate via the second elastic element.

According to some embodiments, a head-mounted display is provided. The head-mounted display includes the hinge, an immovable part, and a movable part. The movable part is movable and rotatable relative to the immovable part. The first plate is mounted on the immovable part and the second plate is mounted on the movable part.

According to some embodiments, a head-mounted display is provided. The head-mounted display includes the hinge, a frame, and an arm. The arm is secured to the frame via the hinge.

BRIEF DESCRIPTION OF THE DRAWINGS

According to some embodiments, the present disclosure can be more fully understood by the subsequent detailed description and examples with references made to the accompanying drawings.

DETAILED DESCRIPTION OF THE INVENTION

The following disclosure provides many different embodiments, or examples, for implementing different features of the provided subject matter. Specific examples of components and arrangements are described below to simplify this disclosure. These are, of course, merely examples and are not intended to be limiting. For example, the formation of a first feature "on" or "above" a second feature in the description that follows may include embodiments in which the first and second features are formed in direct contact, and may also include embodiments in which additional features may be formed between the first and second features, so that the first and second features may not be in direct contact. Ordinal terms such as "first", "second", etc., used in the description and in claims do not by themselves connote any priority, precedence, or order of one element over another, but are used merely as labels to distinguish one element from another element having the same name. In addition, in different examples of this disclosure, symbols or alphabets may be used repeatedly.

Furthermore, spatially relative terms, such as "above" and the like, may be used herein for ease of description to describe one element or feature's relationship to another element or feature as illustrated in figures. The spatially relative terms are intended to encompass different orientations of the device in use or operation in addition to the orientation depicted in figures. The apparatus may be otherwise oriented (rotated 90 degrees or at other orientations) and the spatially relative descriptors used herein may likewise be interpreted accordingly.

Figure 1:
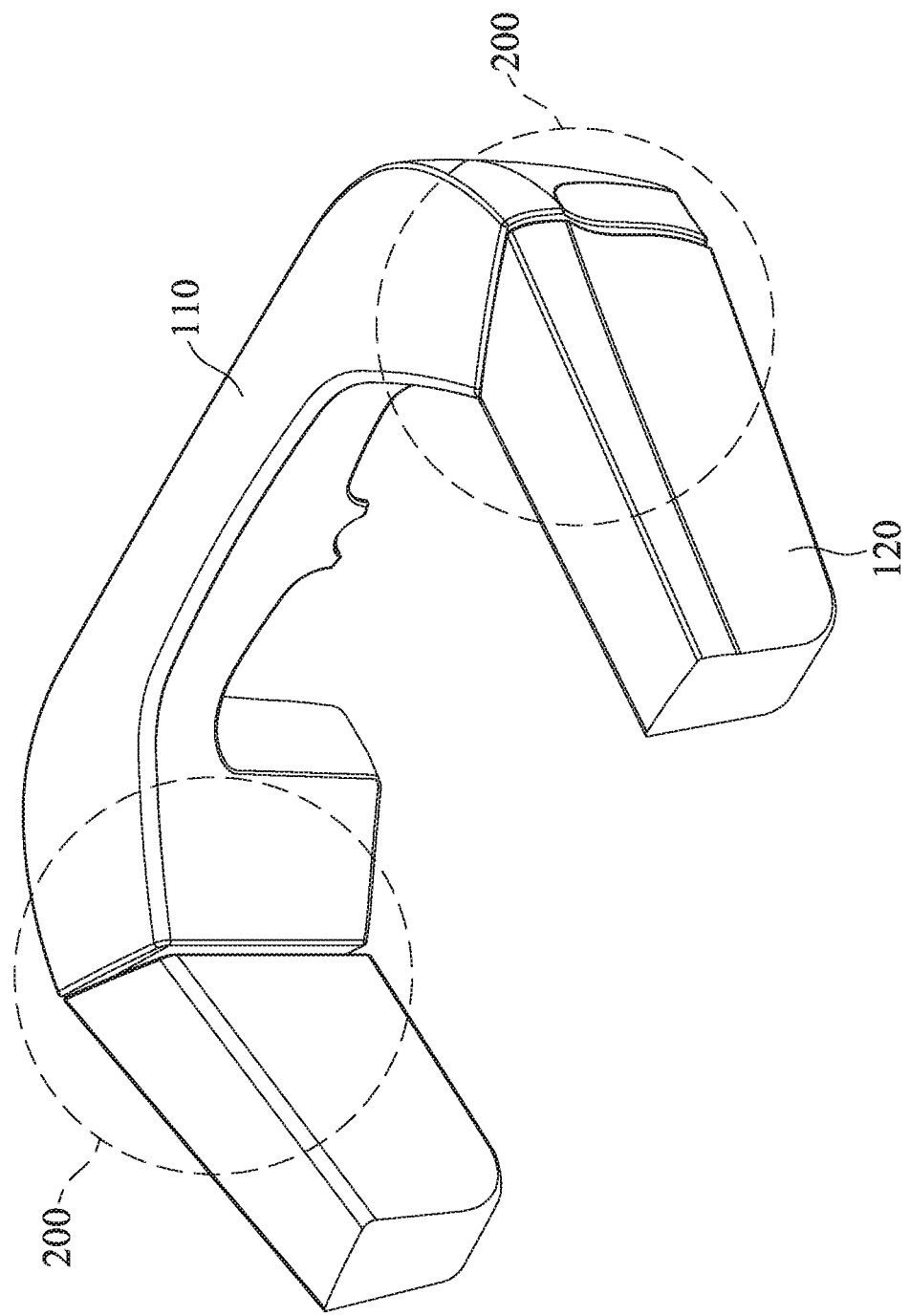
FIG. 1 shows a perspective view of a head-mounted display in an initial state.
Figure 2:
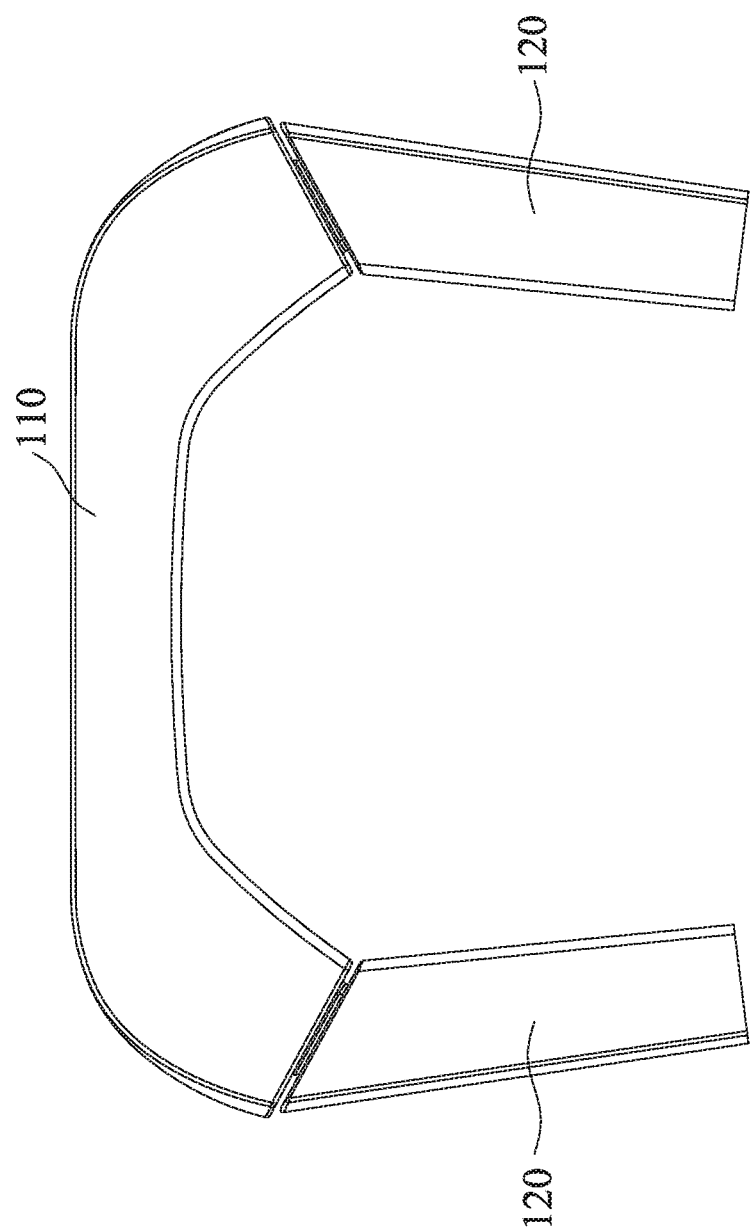
FIG. 2 shows a top view of the head-mounted display in the initial state.

FIG. 1 shows a perspective view of a head-mounted display 100 in an initial state. FIG. 2 shows the top view of the head-mounted display 100 in the initial state. In some embodiments, the head-mounted display 100 may be an augmented reality (AR) device, a virtual reality (VR) device, etc. For clarity of illustration, some elements may be omitted, such as optical elements, display module, etc. The head-mounted display 100 includes a frame 110, two arms 120 (i.e. the left arm and the right arm), and two hinges 200 respectively mounted on the joints between the frame 110 and each one of the arms 120. In FIG. 1, the structures of the hinges 200 are not illustrated, and only the positions of the hinges 200 are denoted.

The arms 120 are movable and rotatable relative to the frame 110 via the hinge 200. The user may adjust the arms 120 so that the head-mounted display 100 matches his or her own head width. As a result, the user is able to wear the head-mounted display 100 securely and comfortably. It should be noted that the head-mounted display 100 is in the form of goggles in this embodiment, but the head-mounted display 100 may be in the form of a helmet in other embodiments. Any apparatus or device including a movable part similar to the arms 120 and an immovable part similar to the frame 110 falls within the scope of the present disclosure.

Figure 3:
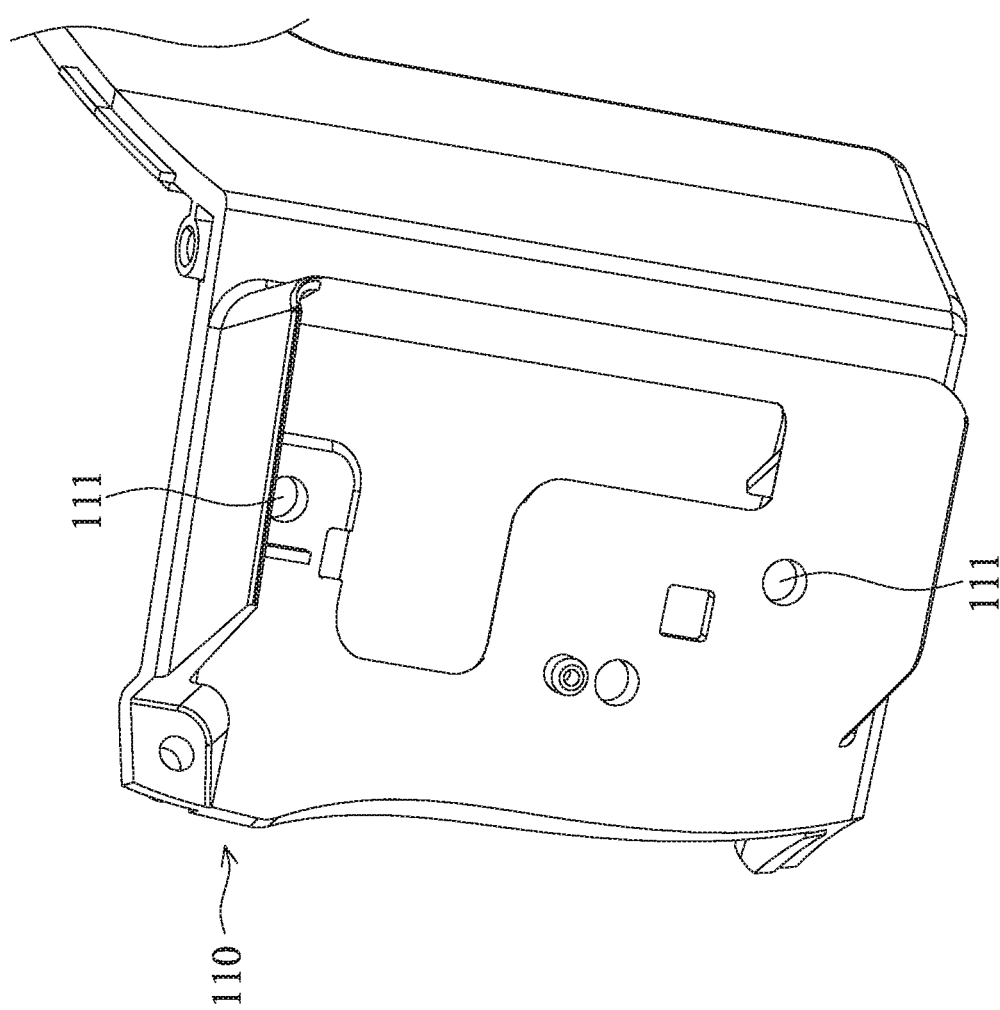
FIG. 3 shows a perspective view of part of a frame of the head-mounted display.
Figure 4:
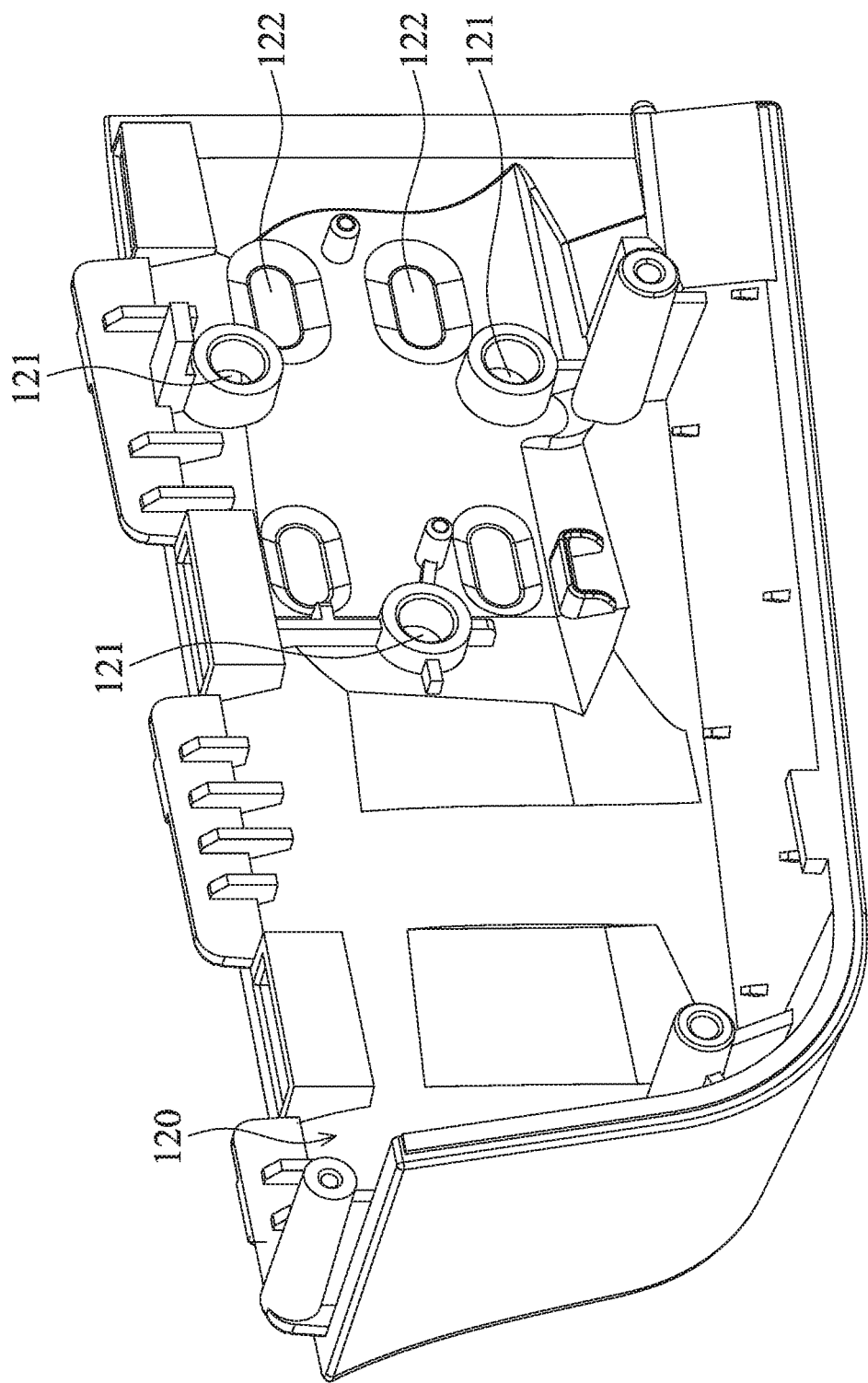
FIG. 4 shows a perspective view of part of an arm of the head-mounted display.

FIG. 3 shows a perspective view of part of the frame 110 of the head-mounted display 100. FIG. 4 shows a perspective view of part of one of the arms 120 of the head-mounted display 100. The frame 110 and the arms 120 may include structures for mounting the hinge 200. For example, the frame 110 may include at least one bore 111 for receiving a screw for mounting the hinge 200. Also, each one of the arms 120 may include at least one bore 121 for receiving a screw for mounting the hinge 200. Additionally, each one of the arms 120 may include at least one oblong slot 122 (or a slotted drill or a slotted hole) for receiving a fastening element (such as the fastening elements 270 as discussed below) for fastening the hinge 200. It should be noted the screw is immovable within the bores 111 and 121, but the fastening element is movable within the oblong slot 122.

Figure 5:
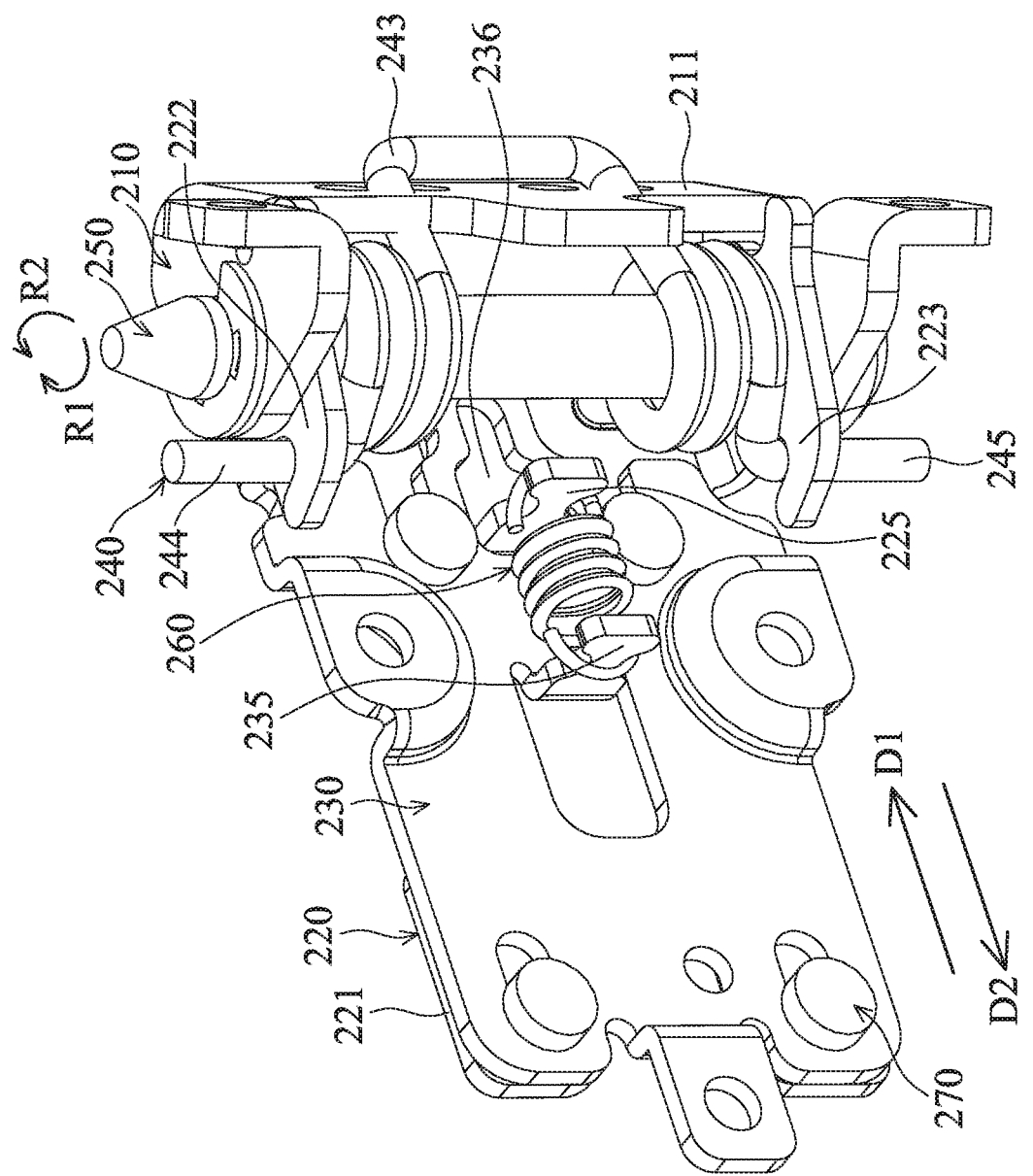
FIG. 5 shows a perspective view of a hinge in the initial state.
Figure 6:
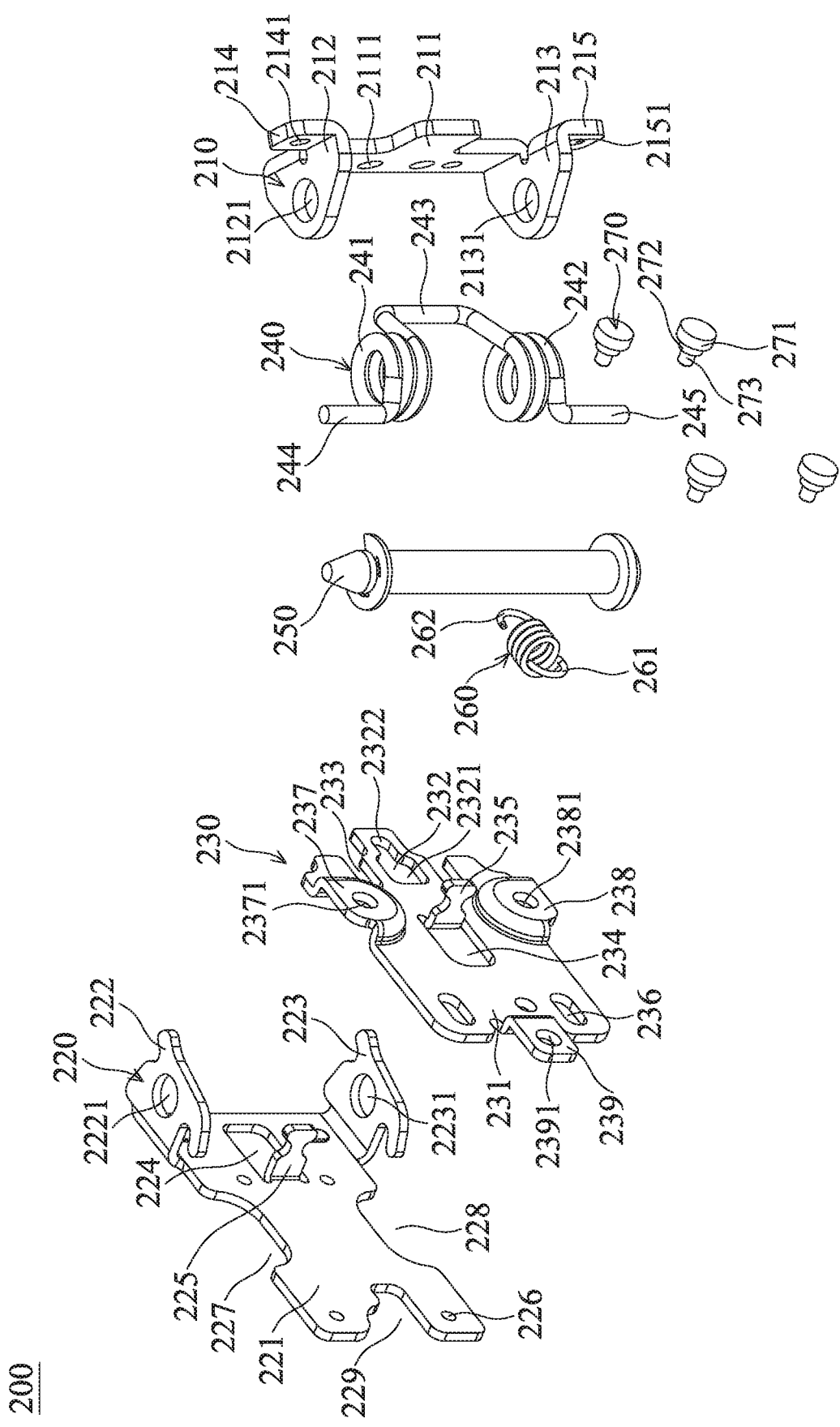
FIG. 6 shows an exploded view of the hinge.

Please refer to FIG. 5 and FIG. 6 to understand the detail of the hinge 200. FIG. 5 shows a perspective view of the hinge 200 in the initial state. FIG. 6 shows an exploded view of the hinge 200. The hinge 200 includes a first plate 210, a second plate 220, a third plate 230, a first elastic element 240, a shaft 250, a second elastic element 260, and a plurality of fastening elements 270.

The first plate 210 includes a first plate main body 211, a first plate upper connection portion 212, a first plate lower connection portion 213, a first plate upper securing portion 214, and a first plate lower securing portion 215. The first plate main body 211 is a flat piece that is placed vertically between the first plate upper connection portion 212 and the first plate lower connection portion 213. The first plate main body 211 is perpendicular to both the first plate upper connection portion 212 and the first plate lower connection portion 213. The first plate main body 211 may be mounted on the frame 110 of the head-mounted display 100. The first plate upper connection portion 212 includes a first plate upper through hole 2121. The first plate lower connection portion 213 includes a first plate lower through hole 2131 corresponding to the first plate upper through hole 2121. The first plate upper securing portion 214 sticks out from first plate upper connection portion 212. The first plate upper securing portion 214 includes a first plate upper bore 2141. The first plate lower securing portion 215 sticks out from the first plate lower connection portion 213. The first plate lower securing portion 215 includes a first plate lower bore 2151. The first plate upper securing portion 214 and the first plate lower securing portion 215 may be coplanar with the first plate main body 211.

The second plate 220 includes a second plate main body 221, a second plate upper connection portion 222, a second plate lower connection portion 223, a second plate hollow 224, a second plate protrusion 225, a plurality of fastening holes 226, an upper concave portion 227, a lower concave portion 228, and a side concave portion 229. The second plate main body 221 is a flat piece between the second plate upper connection portion 222 and the second plate lower connection portion 223. The second plate main body 221 is perpendicular to both the second plate upper connection portion 222 and the second plate lower connection portion 223. The second plate main body 221 may be mounted on the arms 120 of the head-mounted display 100. The second plate upper connection portion 222 includes a second plate upper through hole 2221. The lower connection portion 223 includes a second plate lower through hole 2231 corresponding to the second plate upper through hole 2221. The second plate hollow 224 is eccentrically formed on the second plate main body 221. The second plate protrusion 225 protrudes from the edge of the second plate hollow 224 toward the third plate 230. There are four fastening holes 226 in this embodiment. The fastening holes 226 may receive the fastening elements 270. The number of the fastening holes 226 may be adjusted as long as it is the same as the number of the fastening elements 270. The upper concave portion 227 is formed on the upper edge of the second plate main body 221. The lower concave portion 228 is formed on the lower edge of the second plate main body 221. The side concave portion 229 is formed on one side of the second plate main body 221.

The third plate 230 includes a third plate main body 231, a limit hole 232, at least one U-shaped fastening portion 233, a third plate hollow 234, a third plate protrusion 235, at least one fastening slot 236, an third plate upper securing portion 237, a third plate lower securing portion 238, a third plate side securing portion 239. The third plate main body 231 is a flat piece. The limit hole 232 is formed on the third plate main body 231. The limit hole 232 can be divided into two parts, including a first part 2321 and a second part 2322. The size of the first part 2321 is greater than the second part 2322. There are two U-shaped fastening portions 233 in this embodiment. The U-shaped fastening portions 233 are formed on the third plate main body 231. The U-shaped fastening portions 233 are located on opposite sides of the limit hole 232. The third plate hollow 234 is formed on the third plate main body 231. The third plate protrusion 235 protrudes from the edge of the third plate hollow 234 away from the second plate 220. The fastening slots 236 are formed on the third plate main body 231. The height of each of the fastening slots 236 is substantially the same as the height of each of the U-shaped fastening portions 233. The fastening slots 236 together with the U-shaped fastening portions 233 may receive the fastening elements 270. The third plate upper securing portion 237 is formed on the upper part of the third plate main body 231. The third plate upper securing portion 237 includes a third plate upper bore 2371. The third plate lower securing portion 238 is formed on the lower part of the third plate main body 231. The third plate lower securing portion 238 includes a third plate lower bore 2381. The side securing portion 239 is formed on one side of the third plate main body 231. The side securing portion 239 includes a third plate side bore 2391. The third plate upper bore 2371, the third plate lower bore 2381, and the third plate side bore 2391 may receive screws. The third plate upper securing portion 237, the third plate lower securing portion 238, and the third plate side securing portion 239 may be not coplanar with the third plate main body 231.

The first elastic element 240 may be a torque spring. The first elastic element 240 surrounds the shaft 250. The first elastic element 240 includes an upper coil section 241, a lower coil section 242, a U-shaped unwound section 243, an upper end 244, and a lower end 245. The upper coil section 241 and the lower coil section 242 are received in the space between the second plate upper connection portion 222 and the second plate lower connection portion 223. The upper coil section 241 and the lower coil section 242 wind around the shaft 250. The U-shaped unwound section 243 is between the upper coil section 241 and the lower coil section 242. Part of the U-shaped unwound section 243 passes through the first plate main body 211. The upper end 244 sticks out from the space between the second plate main body 221 and the second plate upper connection portion 222. The lower end 245 sticks out from the space between the second plate main body 221 and the second plate lower connection portion 223.

The shaft 250 is connected to the first plate 210 and the second plate 220. That is, the shaft 250 limits the relative positions of the first plate 210 and the second plate 220.

The second elastic element 260 may be a pull spring. The axial direction of the second elastic element 260 is perpendicular to the axial direction of the first elastic element 240. The second elastic element 260 includes a left end 261 and a right end 262. The left end 261 is connected to (e.g. hooked to) the third plate protrusion 235. The right end 262 is connected to (e.g. hooked to) the second plate protrusion 225. In other words, the second elastic element 260 is connected to the second plate 220 and the third plate 230.

The fastening elements 270 may be rivets. Each one of the fastening elements 270 includes a head 271, a shank 272, and a tail 273. The size of the head 271 is greater than that of the shank 272, and the size of the shank 272 is greater than that of the tail 273.

During the assembling of the hinge 200, the second plate 220 is fastened to the third plate 230 via the fastening elements 270 first. The third plate 230 is disposed on the second plate 220. In detail, the fastening elements 270 pass through the fastening slots 236 or the U-shaped fastening portions 233 of the third plate 230 and the fastening holes 226 of the second plate 220. For example, the tail 273 and the fastening hole 226 may achieve a clearance fit, close fit, or an interference fit. The size of the fastening holes 226 of the second plate 220 is less than that of the fastening slots 236 or the U-shaped fastening portions 233. In other words, when the user views the hinge 200 in a direction that is parallel with the arrangement direction of the second plate 220 and the third plate 230, the fastening holes 226 are within the fastening slots 236 or the U-shaped fastening portions 233.

Figure 9:
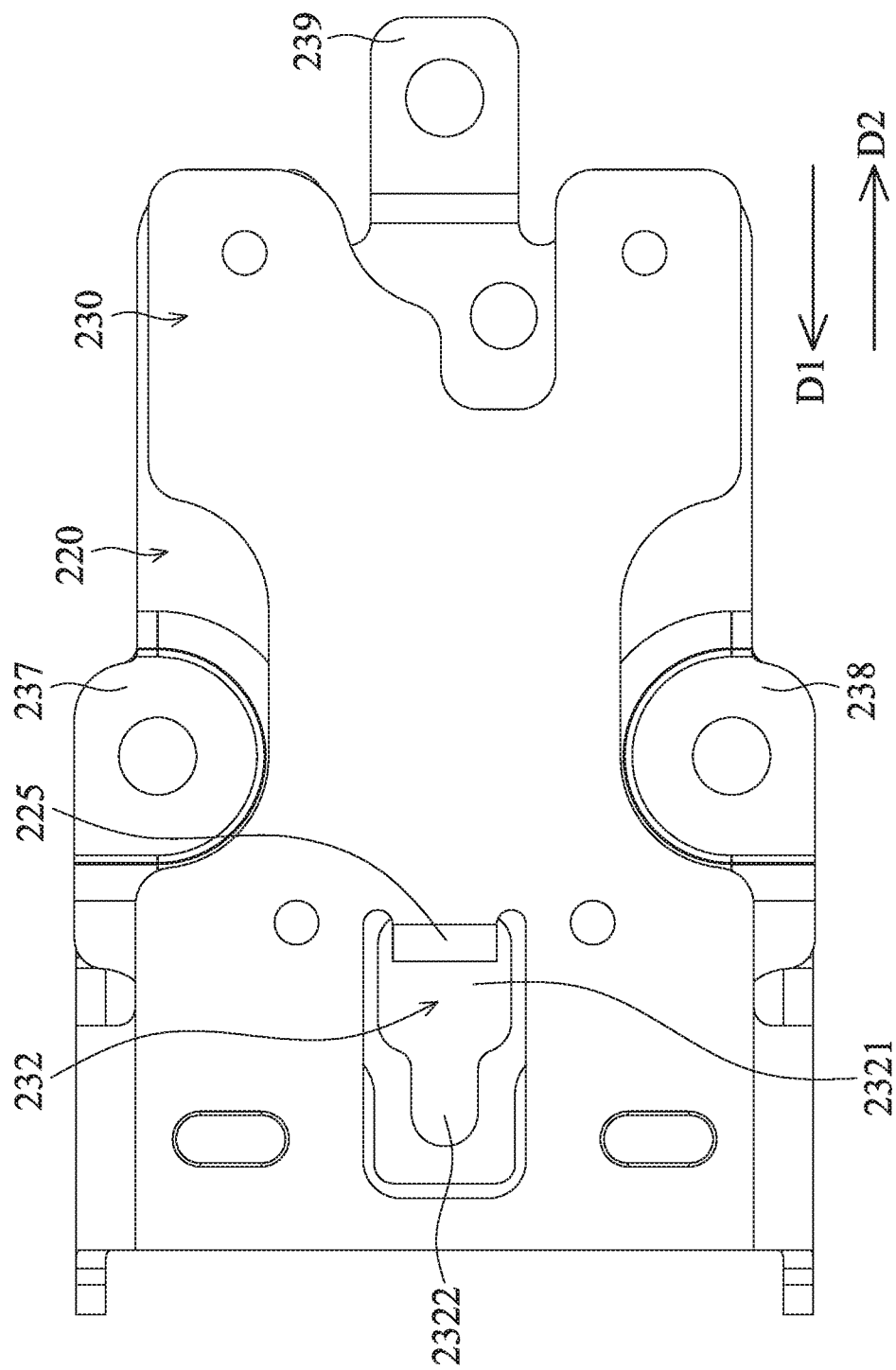
FIG. 9 shows the relative positions of a second plate and a third plate in the middle state.
Figure 12:
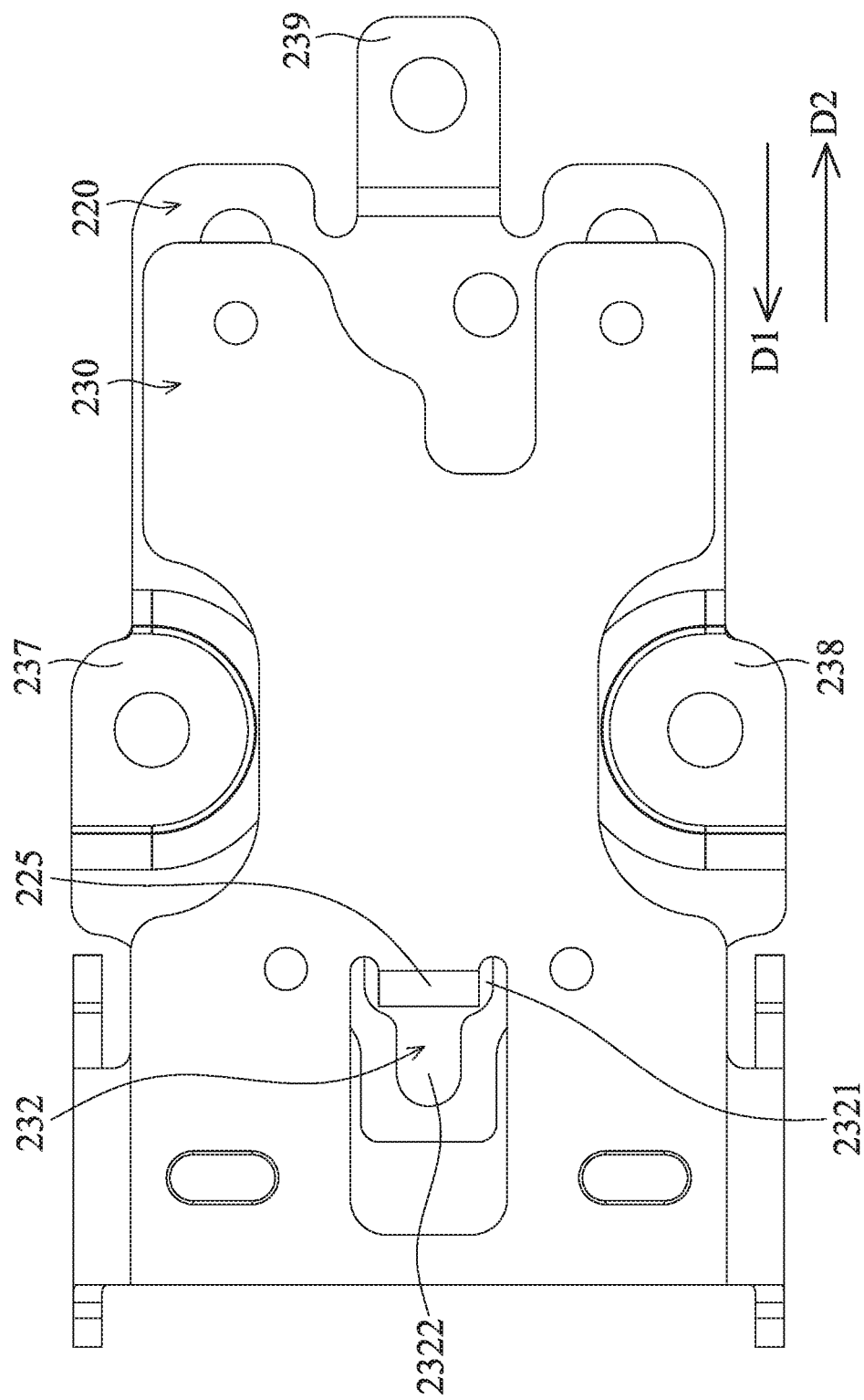
FIG. 12 shows the relative positions of the second plate and the third plate in the final state.

Additionally, the second plate protrusion 225 passes through the limit hole 232. The second plate hollow 224 at least partially overlaps the limit hole 232 of the third plate 230. When the user views the hinge 200 in a direction that is parallel with the arrangement direction of the second plate 220 and the third plate 230, the third plate upper securing portion 237 is within the upper concave portion 227 of the second plate 220 (as shown in FIG. 9 and FIG. 12). Similarly, when the user views the hinge 200 in a direction that is parallel with the arrangement direction of the second plate 220 and the third plate 230, the third plate lower securing portion 238 is within the lower concave portion 228 of the second plate 220 (as shown in FIG. 9 and FIG. 12).

After the second plate 220 is fastened to the third plate 230, the second elastic element 260 is connected to the second plate 220 and third plate 230. Next, the first plate 210 is positioned so that the first plate upper through hole 2121 is aligned with the second plate upper through hole 2221 and the first plate lower through hole 2131 is aligned with the second plate lower through hole 2231. Then, the first elastic element 240 and the shaft 250 are mounted.

In detail, the shaft 250 passes through the first plate lower through hole 2131, the second plate lower through hole 2231, the second plate upper through hole 2221, and the first plate upper through hole 2121. The sizes of the aforementioned through holes 2131, 2231, 2221, and 2121 may be the same as or close to that of the shaft 250.

Furthermore, a plurality of screws may be used for securing the hinge 200 to the other apparatus or device, such as the head-mounted display 100. For example, a screw may pass through the first plate upper bore 2141 (or the first plate lower bore 2151) and the bore 111 to secure the first plate 210 to the frame 110. Alternatively, a screw may pass through the third plate upper bore 2371 (or the third plate lower bore 2381 or the third plate side bore 2391) and the bore 121 to secure the second plate 220 together with the third plate 230 to the arms 120. In this embodiment, there is no bore formed on the second plate 220. It should be noted that the aforementioned bores 111, 121, 2141, 2151, 2371, 2381, and 2391 may be threaded bores.

For clarity of illustration, here, the motion of the hinge 200 is divided into two types, including the rotation and the linear motion (i.e. translational motion). That is, the term "rotation" used herein means the second plate 220 is rotatable around the shaft 250 relative to the first plate 210 (indicated by an arrow R1 and/or an arrow R2) via the first elastic element 240. As for the term "linear motion" used herein, it means the second plate 220 is movable relative to the third plate 230 along the axial direction of the second elastic element 260 (indicated by an arrow D1 and/or an arrow D2) via the second elastic element 260 and/or fastening elements 270.

Figure 7:
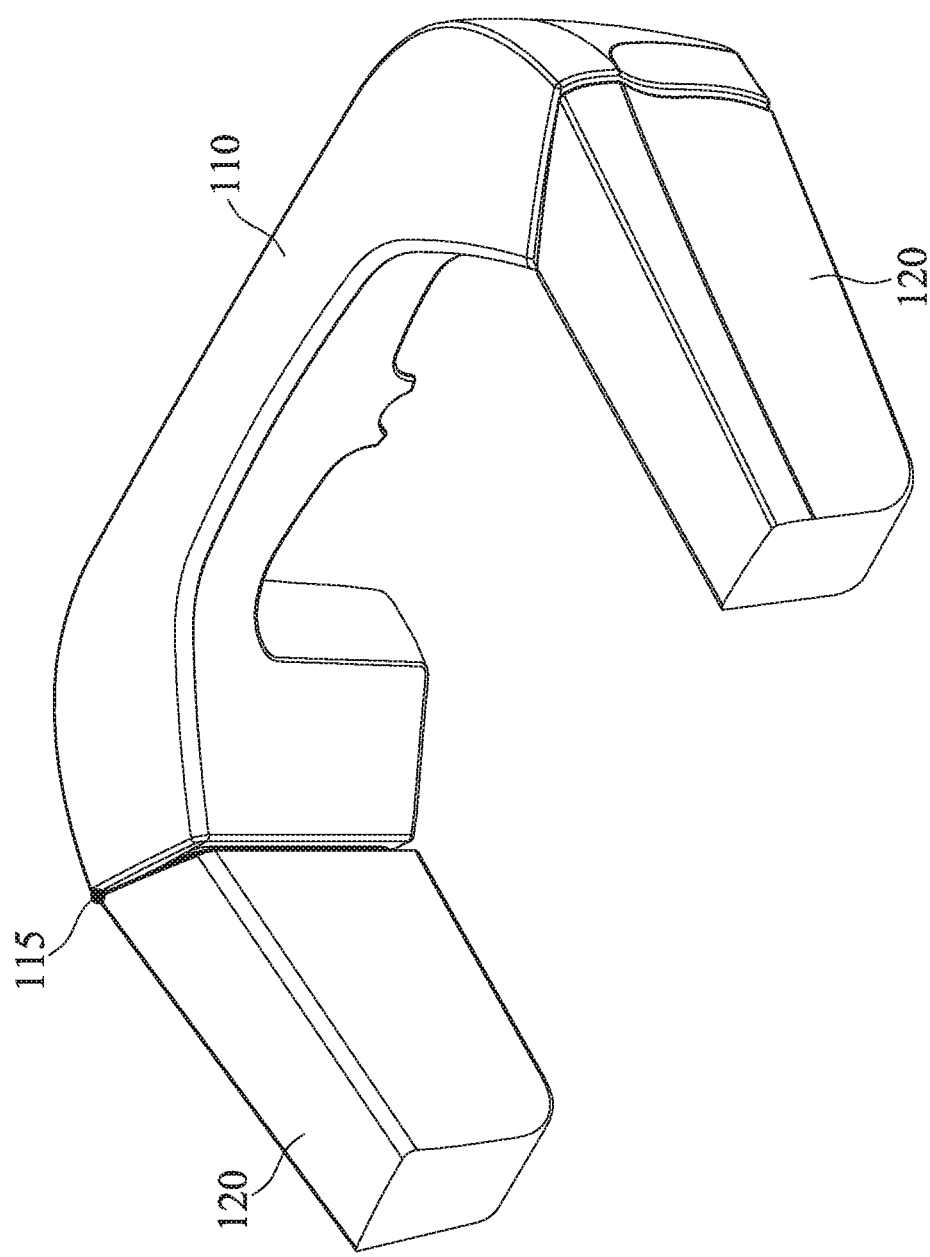
FIG. 7 shows a perspective view of the head-mounted display in a middle state.
Figure 8:
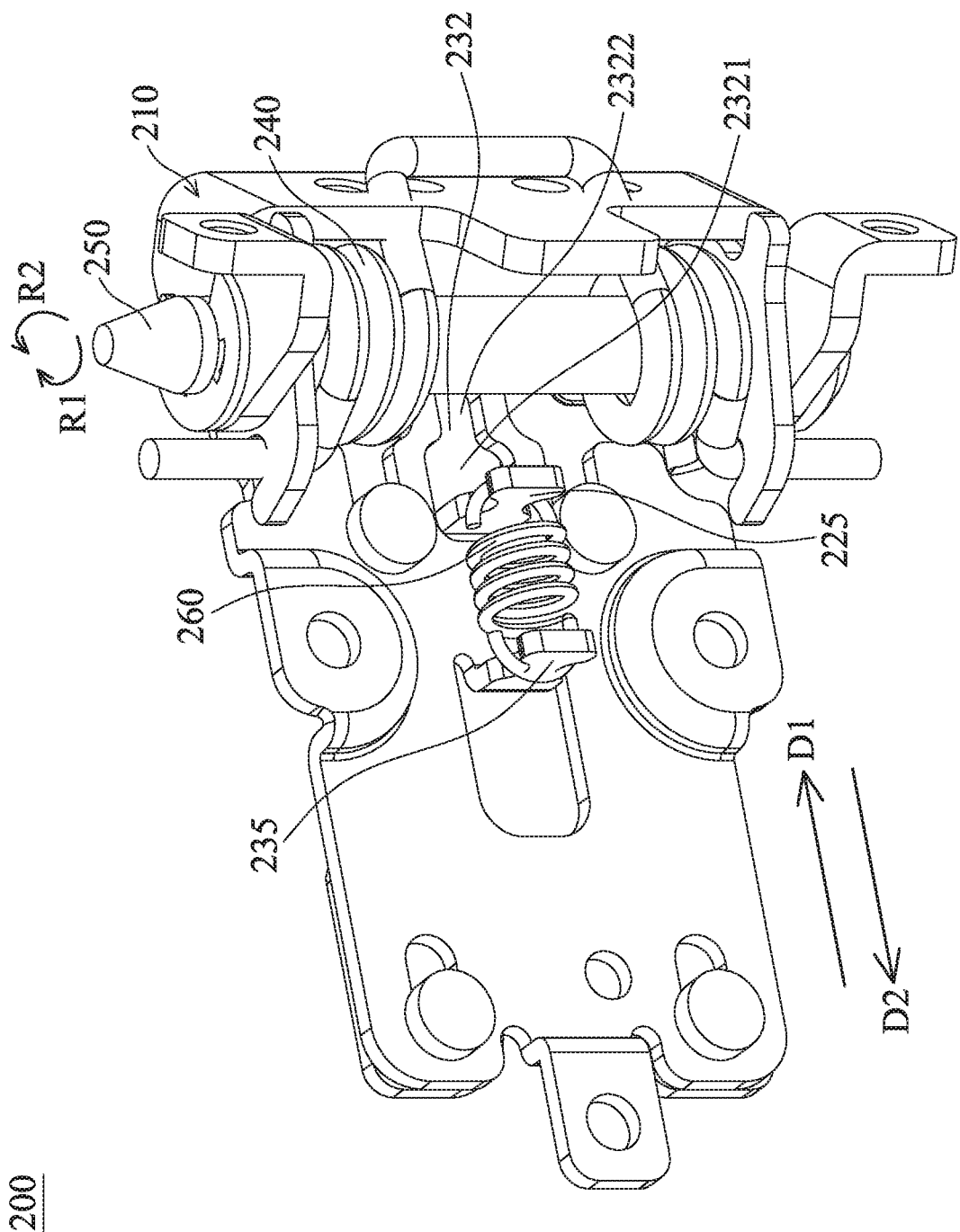
FIG. 8 shows a perspective view of the hinge in the middle state.

Additionally, here, the initial state, the middle state, and the final state of the head-mounted display 100 and the hinge 200 are illustrated. The initial state is defined as the state that the head-mounted display 100 is not adjusted, as shown in FIG. 1, FIG. 2, and FIG. 5. The middle state is defined as the state that each of the arms 120 is in contact with the frame 110 at a pivot 115, as shown in FIG. 7, FIG. 8, and FIG. 9. It should be understood that a pivot between an arm and a frame of some conventional head-mounted displays limits the adjustment of the conventional head-mounted displays. However, the pivot 115 does not limit the adjustment of the head-mounted display 100 of the disclosure. For example, the head-mounted display 100 may be further adjusted to the final state. The final state is defined as the state that the arms 120 cannot further rotate relative to the frame 110 in the direction indicated by the arrow R1 and cannot further move along the direction indicated by the arrow D1. Additionally, when the head-mounted display 100 and the hinge 200 are in the initial state, the position of the second plate 220 is defined as the initial position. Similarly, when the head-mounted display 100 and the hinge 200 are in the middle state, the position of the second plate 220 is defined as the middle position. When the head-mounted display 100 and the hinge 200 are in the final state, the position of the second plate 220 is defined as the final position. The initial position, the middle position, and the final position of the second plate 220 are described in regard to the position of the first plate 210 because the first plate 210 is immovable.

FIG. 7 shows a perspective view of the head-mounted display 100 in the middle state. FIG. 8 shows a perspective view of the hinge 200 in the middle state. FIG. 9 shows the relative positions of the second plate 220 and the third plate 230 in the middle state. From the initial state to the middle state, the head-mounted display 100 is adjusted only by the rotation. That is, from the initial state to the middle state, the second plate 220 only rotates around the shaft 250 relative to the first plate 210. Therefore, the second plate 220 is not movable relative to the third plate 230 along the axial direction of the second elastic element 260 when the second plate 220 is moved between the initial position and the middle position. Since the relative positions of the second plate 220 and the third plate 230 remain the same from the initial state to the middle state, FIG. 9 may also represent the relative positions of the second plate 220 and the third plate 230 from the initial state to the middle state.

Figure 10:
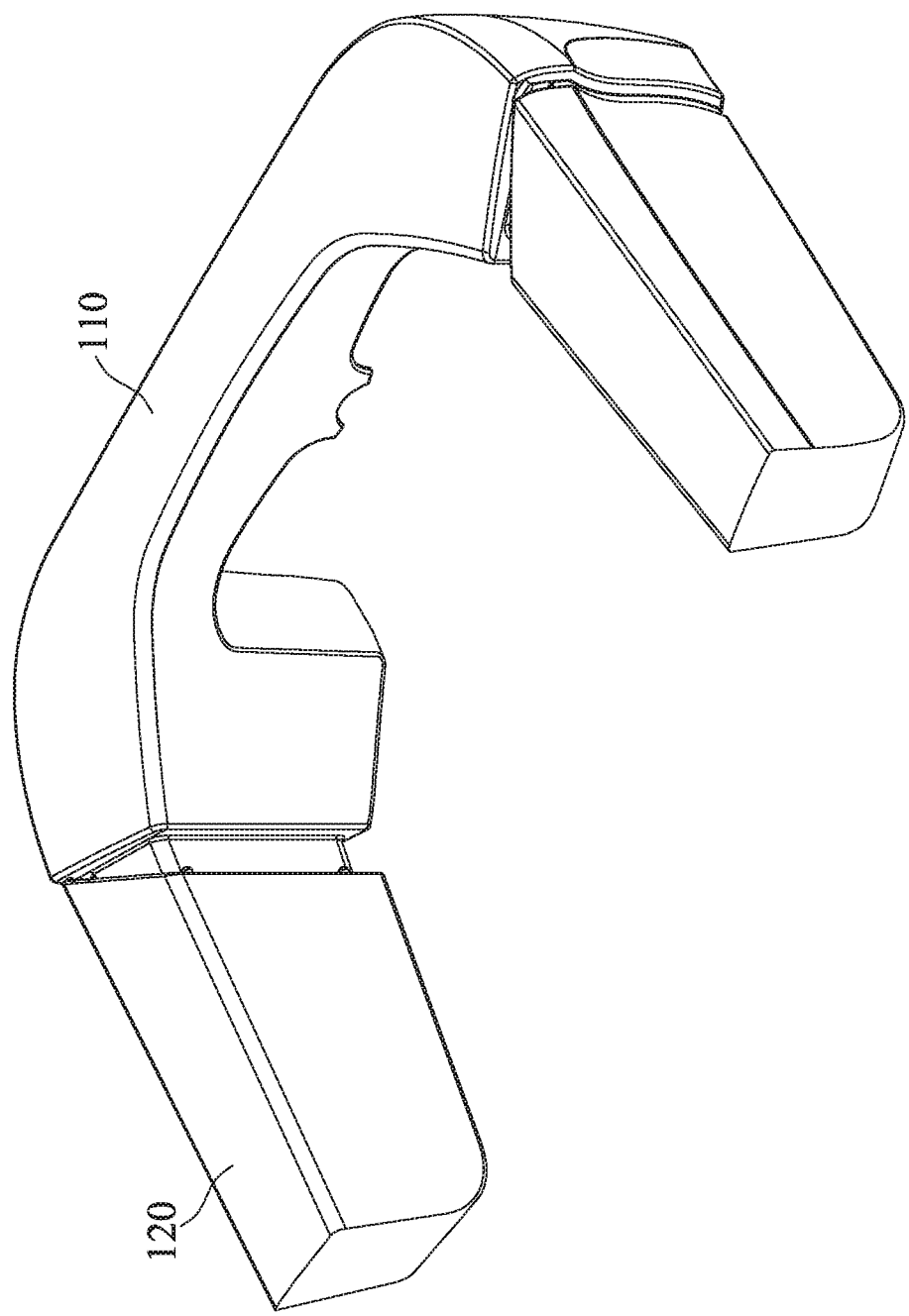
FIG. 10 shows a perspective view of the head-mounted display in a final state.
Figure 11:
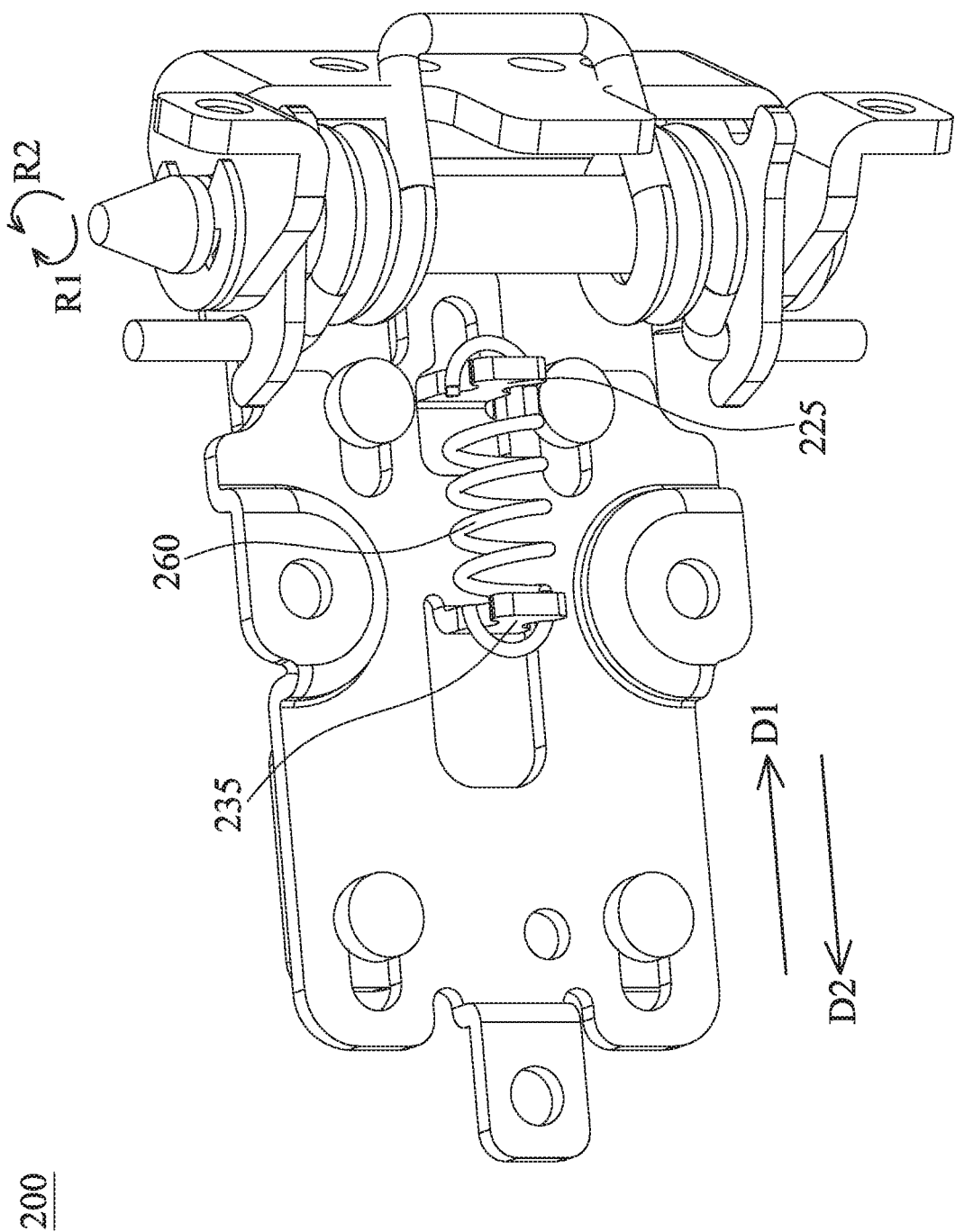
FIG. 11 shows a perspective view of the hinge in the final state.

FIG. 10 shows a perspective view of the head-mounted display 100 in the final state. FIG. 11 shows a perspective view of the hinge 200 in the final state. FIG. 12 shows the relative positions of the second plate 220 and the third plate 230 in the final state. From the middle state to the final state, the head-mounted display 100 is adjusted by both the rotation and the linear motion. That is, from the middle state to the final state, the second plate 220 not only rotates around the shaft 250 relative to the first plate 210 (indicated by the arrow R1) but also moves relative to the third plate 230 along the axial direction of the second elastic element 260 (indicated by the arrow D1) simultaneously. Therefore, the second plate 220 is movable relative to the third plate 230 along the axial direction of the second elastic element 260 when the second plate 220 is moved between the middle position and the final position.

Now, please refer to FIG. 8 and FIG. 11 or FIG. 9 and FIG. 12. The linear motion of the third plate 230 relative to the second plate 220 can be seen clearly from the difference between FIG. 8 and FIG. 11 or between FIG. 9 and FIG. 12. In FIG. 8 and FIG. 9, the second plate protrusion 225 abuts the edge of the first part 2321 of the limit hole 232. In FIG. 11 and FIG. 12, the second plate protrusion 225 is at the boundary of the first part 2321 and the second part 2322 of the limit hole 232 so that the second plate 220 cannot further move relative to the third plate 230 along the direction indicated by the arrow D1. The linear motion of the second plate 220 along the axial direction of the second elastic element 260 is limited via the limit hole 232 of the third plate 230 because the second plate protrusion 225 passes through the limit hole 232 of the third plate 230.

When the user wants to wear the head-mounted display 100 on his or her head, the state of the head-mounted display 100 is changed from the initial state to a different state (not limited to the middle state or the final state) then to an adjustment state. The different state is determined by the relative positions of the frame 110 and the arms 120, which depends on the user. The adjustment state is defined as the state that the user can wear the head-mounted display 100 securely and comfortably, and the position of the second plate 220 in the adjustment state is defined as the adjustment position. The adjustment state is achieved due to the design of the hinge 200 of the present application.

In detail, from the different state to the adjustment state, the second plate 220 is rotatable around the shaft 250 relative to the first plate 210 in the direction indicated by the arrow R2 via the first elastic element 240. Additionally or alternatively, from the different state to the adjustment state, the second plate 220 is linearly movable relative to the second plate 220 in the direction indicated by the arrow D2 via the second elastic element 260. In some embodiments, for the convenience, the different state is exactly the final state. For example, the user simply adjusts the head-mounted display 100 from the initial state to the final state and then wears the head-mounted display 100 on the head. Then, the user releases the arms 120 to make the head-mounted display 100 match his or her head width so that the adjustment state is achieved.

To sum up, from the initial state to the final state (also from final state to the initial state), the second plate 220 is rotatable relative to the first plate 210. Additionally, from the middle state to the final state (also from the final state to the middle state), the second plate 220 is linearly movable relative to the third plate 230. Furthermore, from the different state to the adjustment state, the second plate 220 is rotatable relative to the first plate 210 and/or linearly movable relative to the third plate 230. In other words, from the initial state to the final state, the arms 120 (the movable part) are rotatable relative to the frame 110 (the immovable part) while from the middle state to the final state, the arms 120 (the movable part) are linearly movable relative to the frame 110 (the immovable part). Additionally, from the different state to the adjustment state, the arms 120 (the movable part) are rotatable and/or linearly movable relative to the frame 110 (the immovable part).

A hinge and a head-mounted display applicable for a greater variety of head widths are provided. A pivot between an arm and a frame of the head-mounted display does not limit the adjustment of the head-mounted display due to the design of the hinge. User experience is improved because the user can adjust the head-mounted display to an adjustment state and wear the head-mounted display securely and comfortably.

The foregoing outlines features of several embodiments so that those skilled in the art may better understand the aspects of this disclosure. Those skilled in the art should appreciate that they may readily use this disclosure as a basis for designing or modifying other processes and structures for carrying out the same purposes and/or achieving the same advantages of the embodiments introduced herein. Those skilled in the art should also realize that such equivalent constructions do not depart from the spirit and scope of this disclosure, and that they may make various changes, substitutions, and alterations herein without departing from the spirit and scope of this disclosure. In addition, the scope of this disclosure is not limited to the specific embodiments described in the specification, and each claim constitutes a separate embodiment, and the combination of various claims and embodiments are within the scope of the disclosure.

What is claimed is:

1. A hinge, comprising:
   a first plate;
   a second plate connected to the first plate;
   a third plate disposed on the second plate;
   a shaft connected to the first plate and the second plate;
   a first elastic element surrounding the shaft; and
   a second elastic element connected to the second plate and the third plate;
   wherein the second plate is rotatable around the shaft via the first elastic element;
   wherein the second plate is movable relative to the third plate via the second elastic element;
   wherein a second plate hollow is formed on the second plate, and the second plate comprises a second plate protrusion protruding from an edge of the second plate hollow toward the third plate;
   wherein a third plate hollow is formed on the third plate, and the third plate comprises a third plate protrusion protruding from an edge of the third plate hollow away from the second plate.

2. The hinge as claimed in claim 1, further comprising a plurality of fastening elements, wherein the second plate is fastened to the third plate via the fastening elements.

3. The hinge as claimed in claim 2, wherein the second plate is movable relative to the third plate via the second elastic element and the fastening elements.

4. The hinge as claimed in claim 1, wherein the second elastic element is connected to the second plate protrusion and the third plate protrusion.

5. The hinge as claimed in claim 1, wherein a limit hole comprising a first part and a second part is formed on the third plate, a size of the first part is greater than a size of the second part, and the second plate hollow at least partially overlaps the limit hole of the third plate.

6. The hinge as claimed in claim 5, wherein the second plate protrusion passes through the limit hole of the third plate to limit a linear motion of the second plate along an axial direction of the second elastic element.

7. The hinge as claimed in claim 1, wherein the second plate is rotatable around the shaft relative to the first plate between an initial position and a final position.

8. The hinge as claimed in claim 7, wherein the second plate is rotatable around the shaft relative to the first plate between the final position and an adjustment position.

9. The hinge as claimed in claim 7, wherein the second plate is not movable relative to the third plate along an axial direction of the second elastic element between the initial position and a middle position.

10. The hinge as claimed in claim 9, wherein the second plate is linearly movable relative to the third plate along the axial direction of the second elastic element between the middle position and the final position.

11. The hinge as claimed in claim 1, wherein an axial direction of the first elastic element is perpendicular to an axial direction of the second elastic element.

12. The hinge as claimed in claim 1, wherein the first elastic element comprises two coil sections and a U-shaped unwound section between the two coil sections, and the U-shaped unwound section passes through the first plate.

13. A head-mounted display, comprising:
a hinge as claimed in claim 1;
an immovable part; and
a movable part movable and rotatable relative to the immovable part;
wherein the first plate is mounted on the immovable part and the second plate is mounted on the movable part.

14. The head-mounted display as claimed in claim 13, wherein the movable part is rotatable relative to the immovable part from an initial state to a final state, and the movable part is linearly movable relative to the immovable part from a middle state to the final state.

15. The head-mounted display as claimed in claim 13, wherein a plurality of oblong slots are formed on the movable part to receive the fastening elements.

16. The head-mounted display as claimed in claim 13, further comprising a plurality of screws, wherein a plurality of bores are formed on the first plate, the third plate, the immovable part, and the movable part to receive the screws.

17. The head-mounted display as claimed in claim 16, wherein there is no bore for receiving the screws formed on the second plate.

18. A hinge, comprising:
a first plate;
a second plate connected to the first plate;
a third plate disposed on the second plate;
a shaft connected to the first plate and the second plate;
a first elastic element surrounding the shaft; and
a second elastic element connected to the second plate and the third plate;
wherein the second plate is rotatable around the shaft via the first elastic element;
wherein the second plate is movable relative to the third plate via the second elastic element;
wherein the second plate is rotatable around the shaft relative to the first plate between an initial position and a final position;
wherein the second plate is not movable relative to the third plate along an axial direction of the second elastic element between the initial position and a middle position;
wherein the second plate is linearly movable relative to the third plate along the axial direction of the second elastic element between the middle position and the final position.

19. The hinge as claimed in claim 18, wherein an axial direction of the first elastic element is perpendicular to the axial direction of the second elastic element.

20. The hinge as claimed in claim 18, wherein the first elastic element comprises two coil sections and a U-shaped unwound section between the two coil sections, and the U-shaped unwound section passes through the first plate.

\* \* \* \* \*